United States Patent

Dimroth

[11] B 3,923,774
[45] Dec. 2, 1975

[54] QUINAZOLONE CONTAINING PHENYL-AZO-PYRIDINE COMPOUNDS

[75] Inventor: Peter Dimroth, Ludwigshafen, Germany

[73] Assignee: Badische Anilin- & Soda-Fabrik Aktiengesellschaft, Ludwigshafen (Rhine), Germany

[22] Filed: Apr. 4, 1973

[21] Appl. No.: 348,083

[44] Published under the Trial Voluntary Protest Program on January 28, 1975 as document no. B 348,083.

[30] Foreign Application Priority Data

Apr. 20, 1972 Germany............................ 2219169

[52] U.S. Cl. ............. 260/154; 106/23; 106/288 Q; 260/42.21; 260/256.4 Q
[51] Int. Cl.².......................................... C09B 29/36
[58] Field of Search..................................... 260/154

[56] References Cited
FOREIGN PATENTS OR APPLICATIONS
961,088   6/1964   United Kingdom................. 260/154

*Primary Examiner*—Lorraine A. Weinberger
*Assistant Examiner*—C. F. Warren
*Attorney, Agent, or Firm*—Johnston, Keil, Thompson & Shurtleff

[57] ABSTRACT

Azo pigments of the formula:

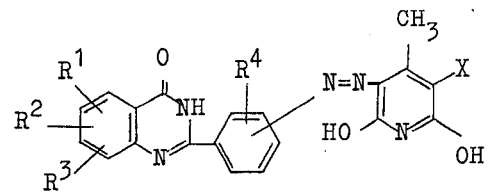

in which
$R^1$ is hydrogen, chloro, bromo or nitro;
$R^2$ and $R^3$ are water-insoluble and are hydrogen or chloro;
$R^4$ is hydrogen, chloro or methyl; and
X is cyano or carbamoyl. The pigments are eminently suitable for coloring resins, surface coatings or printing inks.

4 Claims, No Drawings

QUINAZOLONE CONTAINING PHENYL-AZO-PYRIDINE COMPOUNDS

The invention relates to dyes of the formula (I):

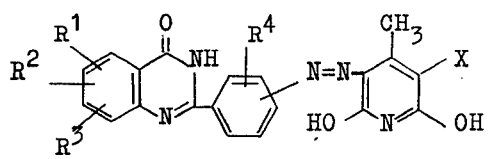

in which
R¹ is hydrogen, chloro, bromo or nitro;
R² is hydrogen or chloro;
R³ is hydrogen or chloro;
R⁴ is hydrogen, chloro or methyl; and
X is cyano or carbamoyl.

The new dyes have pigment properties and have very good solvent fastness properties in all solvents, migration fastness, overcoating fastness, overspraying fastness and good lightfastness. Very bright yellow to orange colorations are obtained.

Individual pigments of formula (I) have extremely high yield and depth of color or in suitable physical form they have unusually good hiding power.

The new pigments are particularly suitable for the production of printing inks and for coloring for example plastics such as polyvinyl chloride or polystyrene, coating compositions or rubber.

Compounds in which R¹ to R⁴ are all hydrogen are particularly important.

Compounds of the formula (I) may be prepared by reacting a diazo compound of an amine of the formula (II):

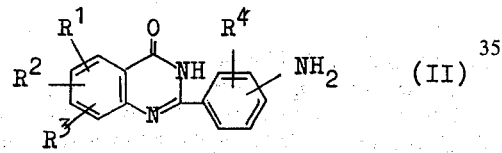

with a coupling component of the formula (III):

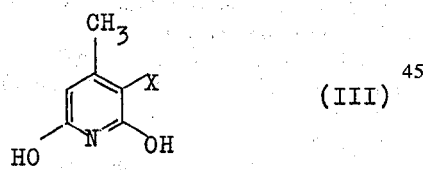

by a conventional method.

Amines of formula (II) are disclosed in Chem.Abst. 56, 8222a (1962).

The physical form in which the pigments are obtained in their preparation is often not the most favorable for the various applications but they can be converted into the most suitable form for the particular purpose by conditioning by a conventional method, for example by heating in water or an organic solvent in the presence or absence of additives or by conversion into appropriate formulations.

The following Examples illustrate the invention. Parts and percentages given in the Examples are by weight unless otherwise stated.

EXAMPLE 1

237 parts of 2-(4'-aminophenyl)-quinazolone-4 is diazotized conventionally in sulfuric acid and the diazo solution is stirred into a mixture of 3,000 parts of water and 800 parts of ice. 150 parts of 2,4-dihydroxy-3-cyano-4-methylpyridine is then added followed by concentrated aqueous sodium acetate solution until a pH of from 5 to 6 has been set up. The whole is then stirred for four hours, suction filtered and washed thoroughly with water. The moist filter cake obtained is stirred in 3,000 parts of glacial acetic acid at 120°C for 5 hours in such a way that water can distil off. The product is suction filtered, washed with water and dried. 340 parts of a yellowish orange powder is obtained in this way. It has the formula:

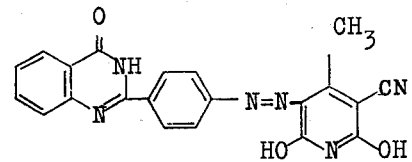

When 237 parts of 2-(3-aminophenyl)-quinazolone-4 is used in the above method 348 parts of a yellow powder is obtained; the compound has the formula:

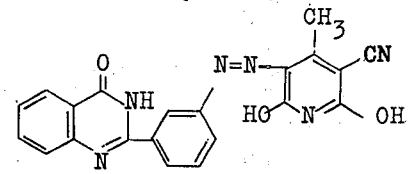

Similar pigments are obtained with the amines set out in the following Table:

| Example | Parts of amine | Amine | Parts of pigment | Shade |
|---|---|---|---|---|
| 2 | 271 | (quinazolone with Cl, NH₂) | 408 | reddish yellow |
| 3 | 271 | (quinazolone with Cl, NH₂) | 406 | yellowish orange (two modifications) |
| 4 | 271 | (quinazolone with Cl, NH₂) | 410 | greenish yellow |

| Example | Parts of amine | Amine | Parts of pigment | Shade |
|---|---|---|---|---|
| 5 | 251 | (structure) | 380 | reddish yellow |
| 6 | 251 | (structure) | 385 | reddish yellow |
| 7 | 285 | (structure) | 390 | yellow |
| 8 | 305 | (structure) | 410 | yellow |
| 9 | 271 | (structure) | 410 | yellow |

O.Z. 29,129

When the compound of the formula:

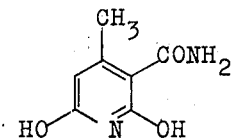

is used as coupling component according to Examples 1 to 9 very similar dyes are obtained which are slightly displaced hypsochromically in shade.

APPLICATION

1. Printing ink

Varnish printing ink for letterpress and offset printing.

10 parts of the pigment of Example 1, paragraph 2, and 80 parts of a letterpress and offset varnish are ground (dispersed) on a three-roll mill. The printing ink thus obtained gives very bright yellow prints which have excellent fastness to overlacquering, good light fastness and great depth of shade.

2. Coating composition

Surface coating based on alkyd-melamine resin for baking; full tone.

5 parts of the pigment of Example 1, paragraph 1, and 95 parts of a baking coating composition mixture of 70 percent of coconut-alkyd resin (based on coconut oil 60 percent in xylene) and 30 percent of melamine resin solution (about 55 percent in butanol/xylene) are milled in an attritor mill. 100 parts of full tone coating composition is thus obtained. A coating prepared therewith is baked for about 30 minutes at 120°C.

A bright orange coating is obtained which is distinguished by particularly good hiding power, excellent fastness to overspraying and good lightfastness.

3. Plastics

Flexible polyvinyl chloride.

0.1 part of the pigment from Example 1, paragraph 1, and 50 parts of a flexible PVC mixture of 65 parts of PVC powder, 35 parts of a plasticizer based on phthalic acid and $C_6$ to $C_8$ alcohols and 2 parts of a stabilizer are homogeneously dispersed on mixing rolls. A bright orange material is obtained in this way. The color has very good fastness to migration and light and particularly good hiding power.

Similar results are obtained when the pigment of Example 1 is replaced by pigments specified in the other Examples.

We claim:

1. A quinazolone azo pigment of the formula

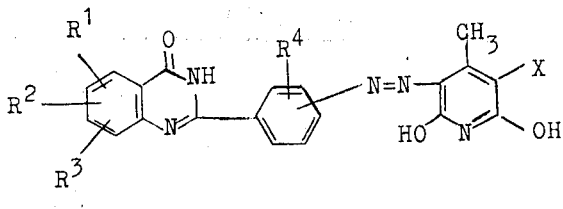

in which:
R¹ is hydrogen, chloro, bromo or nitro;
R² is hydrogen or chloro;
R³ is hydrogen or chloro;
R⁴ is hydrogen, chloro or methyl; and
X is cyano or carbamoyl.

2. An azo pigment as claimed in claim 1 where each of R¹ to R⁴ is hydrogen and X is cyano or carbamoyl.

3. The azo pigment of the formula

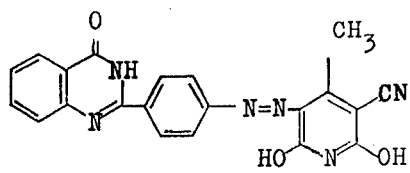
4. The azo pigment of the formula
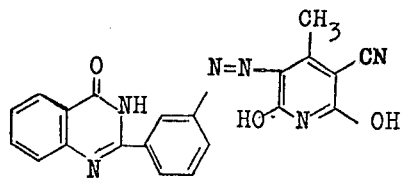
* * * * *

UNITED STATES PATENT AND TRADEMARK OFFICE
CERTIFICATE OF CORRECTION

PATENT NO. : 3,923,774
DATED : December 2, 1975
INVENTOR(S) : DIMROTH

It is certified that error appears in the above-identified patent and that said Letters Patent are hereby corrected as shown below:

In the Abstract, Line 4, delete " $R^2$ and $R^3$ are water-insoluble and are hydrogen or chloro;" and substitute --$R^2$ and $R^3$ are hydrogen or chloro;--

In the Abstract, Line 7, after the word "are" insert --water-insoluble and are--

In Column 3, Line 46, delete "1. Printing ink" and substitute --1. Printing ink:--

In Column 3, Line 54, delete "2. Coating composition" and substitute --2. Coating composition:--

In Column 4, Line 34, delete "Plastics" and substitute --Plastics:--

Signed and Sealed this

Twenty-first Day of September 1976

[SEAL]

Attest:

RUTH C. MASON
Attesting Officer

C. MARSHALL DANN
Commissioner of Patents and Trademarks